United States Patent
Liao et al.

(10) Patent No.: US 9,110,971 B2
(45) Date of Patent: Aug. 18, 2015

(54) METHOD AND SYSTEM FOR RANKING INTELLECTUAL PROPERTY DOCUMENTS USING CLAIM ANALYSIS

(75) Inventors: Wenhui Liao, Minneapolis, MN (US); Sriharsha Veeramachaneni, St. Paul, MN (US); Gary Quick, Eagan, MN (US); Arun Vachher, West Henrietta, NY (US)

(73) Assignee: Thomson Reuters Global Resources (CH)

( * ) Notice: Subject to any disclaimer, the term of this patent is extended or adjusted under 35 U.S.C. 154(b) by 369 days.

(21) Appl. No.: 12/658,165

(22) Filed: Feb. 3, 2010

(65) Prior Publication Data
US 2011/0191310 A1  Aug. 4, 2011

(51) Int. Cl.
*G06F 17/30* (2006.01)
*G06Q 50/18* (2012.01)

(52) U.S. Cl.
CPC .... *G06F 17/30616* (2013.01); *G06F 17/30657* (2013.01); *G06F 17/30696* (2013.01); *G06Q 50/18* (2013.01)

(58) Field of Classification Search
CPC .............. G06F 17/30011; G06F 17/30864; G06F 2216/11; G06F 17/30728; G06F 17/30643; G06F 17/30734; G06F 17/30657; G06F 17/30616; G06F 17/30696
USPC ......... 707/722, 728, 923, 930, 937, 706, 723, 707/729
See application file for complete search history.

(56) References Cited

U.S. PATENT DOCUMENTS

| | | | | |
|---|---|---|---|---|
| 5,619,632 A * | 4/1997 | Lamping et al. | ............... | 345/441 |
| 5,623,679 A * | 4/1997 | Rivette et al. | ................. | 715/255 |
| 5,623,681 A * | 4/1997 | Rivette et al. | ................. | 715/255 |
| 5,642,502 A * | 6/1997 | Driscoll | ............................... | 1/1 |
| 5,721,910 A * | 2/1998 | Unger et al. | ................... | 707/758 |
| 5,754,840 A * | 5/1998 | Rivette et al. | ........................... | 1/1 |
| 5,761,497 A * | 6/1998 | Holt et al. | ............. | 1/1 |
| 5,774,833 A * | 6/1998 | Newman | .......................... | 704/9 |
| 5,799,325 A * | 8/1998 | Rivette et al. | ................. | 715/209 |
| 5,806,079 A * | 9/1998 | Rivette et al. | ................. | 715/210 |
| 5,808,615 A * | 9/1998 | Hill et al. | ...................... | 715/853 |
| 5,809,318 A * | 9/1998 | Rivette et al. | ................. | 715/202 |
| 5,832,476 A * | 11/1998 | Tada et al. | ..................... | 707/723 |
| 5,870,770 A * | 2/1999 | Wolfe | ............................ | 715/805 |
| 5,950,214 A * | 9/1999 | Rivette et al. | ................. | 715/202 |

(Continued)

OTHER PUBLICATIONS

PCT International Search Report, PCT/US2011/000190, May 18, 2011, 10pgs.

(Continued)

*Primary Examiner* — Thanh-Ha Dang
(74) *Attorney, Agent, or Firm* — Valenti, Hanley & Robinson, PLLC; Kevin T. Duncan

(57) ABSTRACT

The present invention provides a method and system for re-ranking search results in a patent retrieval system where the query text is derived in whole or in part from a patent claim, which may be from an existing patent or a prospective claim. The re-ranking is based on several features of the candidate patent, such as the text similarity to the claim, international patent code or other classification or subject matter relatedness or overlap, and internal citation structure of the candidates. One alternative aspect provides a re-ranker that is trained on automatically generated training data, thus obviating the expensive and time-intensive step of expert annotation.

36 Claims, 9 Drawing Sheets

(56) References Cited

U.S. PATENT DOCUMENTS

| | | | |
|---|---|---|---|
| 6,078,913 A * | 6/2000 | Aoki et al. | 1/1 |
| 6,175,824 B1 * | 1/2001 | Breitzman et al. | 705/36 R |
| 6,339,767 B1 * | 1/2002 | Rivette et al. | 707/781 |
| 6,389,434 B1 * | 5/2002 | Rivette et al. | 715/209 |
| 6,499,026 B1 * | 12/2002 | Rivette et al. | 1/1 |
| 6,556,992 B1 * | 4/2003 | Barney et al. | 1/1 |
| 7,437,471 B2 * | 10/2008 | Hohmann et al. | 709/230 |
| 7,523,126 B2 * | 4/2009 | Rivette et al. | 1/1 |
| 7,657,476 B2 * | 2/2010 | Barney | 705/35 |
| 7,716,060 B2 * | 5/2010 | Germeraad et al. | 705/310 |
| 7,716,226 B2 * | 5/2010 | Barney | 707/748 |
| 7,962,511 B2 * | 6/2011 | Barney | 707/776 |
| 8,065,307 B2 * | 11/2011 | Haslam et al. | 707/738 |
| 8,126,883 B2 * | 2/2012 | Qiu | 707/723 |
| 2002/0007373 A1 * | 1/2002 | Blair et al. | 707/505 |
| 2002/0035499 A1 * | 3/2002 | Germeraad et al. | 705/9 |
| 2002/0082778 A1 * | 6/2002 | Barnett et al. | 702/1 |
| 2002/0169743 A1 * | 11/2002 | Arnold et al. | 707/1 |
| 2003/0187832 A1 * | 10/2003 | Reader | 707/3 |
| 2004/0015481 A1 * | 1/2004 | Zinda | 707/1 |
| 2004/0181427 A1 * | 9/2004 | Stobbs et al. | 705/1 |
| 2004/0220842 A1 * | 11/2004 | Barney | 705/7 |
| 2005/0261927 A1 * | 11/2005 | Bilak et al. | 705/1 |
| 2006/0122849 A1 * | 6/2006 | Masuyama et al. | 705/1 |
| 2006/0294060 A1 * | 12/2006 | Masuyama | 707/3 |
| 2007/0078886 A1 * | 4/2007 | Rivette et al. | 707/102 |
| 2007/0088743 A1 * | 4/2007 | Kikuchi et al. | 707/104.1 |
| 2007/0124166 A1 * | 5/2007 | Van Luchene | 705/1 |
| 2007/0136116 A1 * | 6/2007 | Germeraad et al. | 705/7 |
| 2007/0208669 A1 * | 9/2007 | Rivette et al. | 705/59 |
| 2007/0219853 A1 * | 9/2007 | Van Luchene et al. | 705/11 |
| 2007/0219854 A1 * | 9/2007 | Mueller et al. | 705/11 |
| 2007/0233659 A1 * | 10/2007 | Kim | 707/3 |
| 2007/0288256 A1 * | 12/2007 | Speier | 705/1 |
| 2007/0294232 A1 * | 12/2007 | Gibbs et al. | 707/3 |
| 2008/0033741 A1 * | 2/2008 | Van Luchene et al. | 705/1 |
| 2008/0154848 A1 * | 6/2008 | Haslam et al. | 707/3 |
| 2008/0183759 A1 * | 7/2008 | Dehlinger | 707/104.1 |
| 2008/0228752 A1 * | 9/2008 | Huang et al. | 707/5 |
| 2009/0070101 A1 * | 3/2009 | Masuyama et al. | 704/9 |
| 2009/0070297 A1 * | 3/2009 | Hadzima et al. | 707/3 |
| 2009/0077073 A1 * | 3/2009 | Masuyama et al. | 707/6 |
| 2009/0112642 A1 * | 4/2009 | Uekane et al. | 705/7 |
| 2009/0177656 A1 * | 7/2009 | Carter | 707/6 |
| 2009/0259506 A1 * | 10/2009 | Barney | 705/7 |
| 2009/0276421 A1 * | 11/2009 | Qiu | 707/5 |
| 2010/0005094 A1 * | 1/2010 | Poltorak | 707/5 |
| 2010/0094781 A1 * | 4/2010 | Barney | 705/500 |
| 2010/0114587 A1 * | 5/2010 | Masuyama et al. | 705/1.1 |
| 2010/0114920 A1 * | 5/2010 | Srivastava et al. | 707/757 |
| 2010/0125566 A1 * | 5/2010 | Gibbs et al. | 707/722 |
| 2010/0131513 A1 * | 5/2010 | Lundberg et al. | 707/741 |
| 2011/0040717 A1 * | 2/2011 | Rho et al. | 706/50 |
| 2011/0066612 A1 * | 3/2011 | Resnick | 707/728 |
| 2011/0289096 A1 * | 11/2011 | Barney | 707/749 |
| 2014/0250119 A1 * | 9/2014 | Bhattiprolu et al. | 707/728 |

OTHER PUBLICATIONS

M. Aono. "Leveraging category-based lsi for patent retrieval," Proceedings of NTCIR-6 Workshop Meeting. pp. 373-376. 2007.

Atsushi Fujii, "Enhancing patent retrieval by citation analysis," Proceedings of the 30th Annual International ACM Conference on Research and Development in (cont'd below).

Information Retrieval (SIGIR). pp. 793-794. 2007.

J. Kim, Y.H. Lee, S.H. Na, and J.H. Lee. "Postech at ntcir-6 english patent retrieval subtask," Proceedings of NTCIR-6 Workshop Meetings. pp. 393-395. 2007.

H. Mase and M. Iwayama. "Ntcir-6 patent retrieval experiments at hitachi," Proceedings of NTCIR-6 Workshop Meetings. pp. 403-406. 2007.

H. Nanba. "Query expansion using an automatically constructed thesaurus," Proceedings of NTCIR-6 Workshop Meetings, pp. 414-419. 2007.

S. Robertson, S. Walker, S. Jones, M.M. Hancock-Beaulieu, and M. Gatford. "Okapi at trec-3," Proceedings of the 3rd Text Retrieval Conference. pp. 109-126. 1994.

H. Tanioka and K. Yamamoto. "A passage reitreival system using query expansion and emphasis," Proceedings of NTCIR-6 Workshop Meetings. pp. 428-432. 2007.

Y.H. Tseng, C.Y. Tsai, and D.W. Huang. "Invalidity search for uspto patent documents using different patent surrogates,".

Proceedings of NTCIR-6 Workshop Meetings. pp. 390-392. 2007.

H. Turtle. "Natural language vs. boolean query evaluation: a comparison of retrieval performance," Proceedings of the 17th Annual International.

ACM SIGIR Conference on Research and Development in Information Retrieval. pp. 212-220. Dublin, Ireland. 1994.

H. Mase, T. Matsubayashi, Y. Ogawa, M. Iwayama, and T. Oshio. "Proposal of two-stage patent retrieval method considering the claim structure,".

ACM Transactions on Asian Language Information Processing (TALIP). 4(2):190-206. 2005.

Xiaobing Xue and W. Bruce Croft. "Transforming Patents into Prior-Art Queries," SIGIR. Boston, MA. 2009.

Shariq Bashir and Andreas Rauber. "Improving Retrievability of Patents with Cluster-Based Pseudo-Relevance Feedback Documents Selection," CIKM. Hong Kong, China. 2009.

Xiaobing Xue and W. Bruce Croft. "Automatic Query Generation for Patent Search," CIMK. Hong Kong, China. 2009.

* cited by examiner

Matching Claims For:
US PAT 7448964

1. A golf club head comprising: a hollow body having a heel end, a toe end, a front wall, a crown extending rearwardly from an upper portion of said front wall, and a sole extending rearwardly from a lower portion of said front wall; a crown having an inner surface, an outer surface and a thickness dimension measured between said inner and outer surfaces; a plurality of thin regions in said crown, each of said regions, each row of said plurality of rows being separated from an adjacent row by an arcuate rib having a thickness greater than the thickness of said plurality of thin regions from an adjacent thin region by a substantially linear rib having a thickness greater than the thickness of said plurality of thin regions; and said thickness dimension in said plurality of thin regions being greater than the thickness dimension in other regions of said crown.

1. GOLF CLUB HEAD HAVING A CROWN WITH THIN REGIONS
US PAT 7448964, Issue Date: 2008-11-11, 1. A golf club head comprising: a hollow body having a heel end, a toe end, a front wall, a crown extending rearwardly from an upper portion of said front wall, and a sole extending rearwardly from a lower portion of said front wall; said crown having an inner surface, an outer surface and a thickness dimension measured between said inner and outer surfaces; a plurality of thin regions in said crown, each of said plurality of thin regions arranged to form a plurality of rows of thin regions, each row of said plurality of rows being separated from an adjacent row by an arcuate rib having a thickness greater than the thickness of said plurality of thin regions, each of said plurality of thin regions in a row further being separated from an adjacent thin region by a substantially linear rib having a thickness greater than the thickness of said plurality of thin regions; and said thickness dimension in said plurality of thin regions being reduced when compared with said thickness dimension in other regions of said crown.

2. GOLF CLUB HEAD FOR A HYBRID GOLF CLUB
US PAT 7316624, Issue Date: 2008-01-08, Karsten Manufacturing Corporation (Phoenix, AZ ), 1. A golf club head comprising: a body having a heel end, a toe end, a front wall arranged for impacting a golf ball, and a crown extending between the heel and toe ends, the crown having a front portion and a rear portion; the body also having a sole extending between the heel and toe ends and extending between the front wall and the crown rear portion, the sole including a primary portion and a relief portion; the sole relief portion extending rearwardly away from the front wall and upwardly toward the crown rear portion when the sole primary portion is positioned on a substantially horizontal surface; the sole having a depth dimension measured along the horizontal surface in a midplane that is perpendicular to the front wall and intersects the body midway between the heel and the toe ends; the sole relief portion extending at least one half of the sole depth dimension; a first transition region between the sole primary portion and the sole relief portion; a second transition region between the sole relief portion and the crown rear portion; the sole primary portion having a generally constant thickness; the sole relief portion varying in thickness from a first thickness at the first transition region that is substantially equal to the constant thickness of the sole primary portion to a second thickness that is greater than the first thickness and is located between the first and second transition regions; and the sole relief portion varying in thickness along a diagonal plane that extends diagonally from a first area adjacent an intersection of the toe end, the sole primary portion and the sole relief portion to a second area adjacent an intersection of the heel end, the crown rear portion and the sole relief portion.

3. GOLF CLUB HEAD
US PAT 6824475, Issue Date: 2004-11-30, Taylor Made Golf Company, Inc. (Carlsbad, CA ), 63. A golf club head having a coefficient of restitution measuring at least about 0.80, comprising: a body having a crown and a sole that cooperate to define an opening, a face plate fixedly secured proximate the opening, wherein the face plate is oriented generally vertically, having a sweet spot that defines the preferred location at which a golf ball is to be struck; wherein the face plate defines a thickened, generally ring-shaped region surrounding the face plate's geometric center, a reduced thickness inner region radially inward of the ring-shaped region and including the face plate's geometric center, and a thin outer region radially outward of the geometric center and the ring-shaped region, wherein at least one boundary lines separate the ring-shaped region from the outer region, said boundary line being located where the face plate has a thickness that is about 50% more than the minimum thickness of the outer region, and wherein the combined areas of the ring-shaped and inner region is between about 25% and about 75% of the total area of the ring-shaped, inner and outer regions.

Figure 9

METHOD AND SYSTEM FOR RANKING INTELLECTUAL PROPERTY DOCUMENTS USING CLAIM ANALYSIS

FIELD OF THE INVENTION

The present invention relates generally to natural language processing, information retrieval and more particularly to determining relevancy of terms within documents. The invention relates to statistical weighting of terms or other aspects of documents to determine how relevant or important the term or aspect is to that document and in particular to the content of that document. Also, the invention relates to processes, software and systems for use in delivery of services related to the legal, corporate, and other professional sectors. The invention relates to a system that presents searching functions to users, such as subscribers to a professional services related service, processes search terms and applies search syntax across document databases, and displays search results generated in response to the search function and processing.

BACKGROUND OF THE INVENTION

With the advents of the printing press, typeset, typewriting machines, computer-implemented word processing and mass data storage, the amount of information generated by mankind has risen dramatically and with an ever quickening pace. As a result there is a continuing and growing need to collect and store, identify, track, classify and catalogue for retrieval and distribution this growing sea of information. One traditional form of cataloging and classifying information, e.g., books and other writings, is the Dewey Decimal System. In the area of patents, millions of patents have issued in the U.S. alone. Each patent is issued with a set of claims that define the property right granted by the U.S. and owned by the patentee. In addition to issued patents are the growing number of published patent applications that are now available for searching and reviewing. Each published patent application likewise contains one or more claims to the invention. The U.S. Patent Office uses a subject matter-based classification system to place submitted patent applications in technology centers, classes, and sub-classes of art to more efficiently handle the searching and granting, or denying, of patent claims. In addition a set of International Patent Codes further classifies patents and applications by subject matter. Historically, examiners assigned to examine patent applications would consult "shoes," i.e., a box associated with a particular sub-class and containing collections of patents grouped together based on subject matter disclosed and claimed by previous inventors. Prior to electronic searching examiners would consult by hand the shoes in an effort to find prior art, this was very tedious, time-consuming, and inefficient. Electronic databases effectively place patent documents in electronic "shoes" for searching.

In many areas and industries, including the financial and legal sectors and areas of technology, for example, there are content and enhanced experience providers, such as The Thomson Reuters Corporation. Such providers identify, collect, analyze and process key data for use in generating content, such as law related reports, articles, etc., for consumption by professionals and others involved in the respective industries, e.g., lawyers. Providers in the various sectors and industries continually look for products and services to provide subscribers, clients and other customers and for ways to distinguish their firms over the competition. Such provides strive to create and provide enhance tools, including search and ranking tools, to enable clients to more efficiently and effectively process information and make informed decisions.

For example, with advancements in technology and sophisticated approaches to searching across vast amounts of data and documents, e.g., database of issued patents, published patent applications, etc., professionals and other users increasingly rely on mathematical models and algorithms in making professional and business determinations. Existing methods for applying search terms across large databases of patent documents, for example, have room for considerable improvement as they frequently do not adequately focus on the key information of interest to yield a focused and well ranked set of documents to most closely match the expressed searching terms and data. Although such computer-based systems have shortcomings, there has been significant advancement over searching, identifying, filtering and grouping IP documents by hand, which is prohibitively time-intensive, costly, inefficient, and inconsistent.

Search engines are used to retrieve documents in response to user defined queries or search terms. To this end, search engines may compare the frequency of terms that appear in one document against the frequency of those terms as they appear in other documents within a database or network of databases. This aids the search engine in determining respective "importance" of the different terms within the document, and thus determining the best matching documents to the given query. One method for comparing terms appearing in a document against a collection of documents is called Term Frequency-Inverse Document Frequency (TFIDF). In this method a percentage of term count as compared to all terms within a subject document is assigned (as a numerator) and that is divided by the logarithm of the percentage of documents in which that term appears in a corpus (as the denominator). More specifically, TFIDF assigns a weight as a statistical measure used to evaluate tile importance of a word to a document in a collection of documents or corpus. The relative "importance" of tile word increases proportionally to tile number of times or "frequency" such word appears in the document. The importance is offset or compared against the frequency of that word appearing in documents comprising the corpus. TFIDF is expressed as the $\log(N/n(q))$ where q is the query term, N is the number of documents in the collection and N(q) is the number of documents containing q. TFIDF and variations of this weighting scheme are typically used by search engines, such as Google, as a way to score and rank a document's relevance given a user query. Generally for each term included in a user query, the document may be ranked in relevance based on summing the scores associated with each term. The documents responsive to the user query may be ranked and presented to the user based on relevancy as well as other determining factors.

SUMMARY OF THE INVENTION

The present invention provides a method and system for re-ranking search results in a patent document retrieval system where the query text is derived in whole or in part from a patent claim, which may be from an existing patent. The re-ranking is based on one or more features of the candidate patent, such as the text similarity to the claim, international patent code or other classification relatedness or overlap, and internal citation structure of the candidates. One feature of the invention provides a re-ranker that is trained on automatically generated training data, thus obviating the expensive and time-intensive step of expert annotation. In implementation, the inventive concepts may be automatically or semi-automatically, i.e., with some degree of human intervention, performed.

Inventors, patent examiners, agents and attorneys need a reliable patent retrieval system to, for example, research prior art, study the validity of a patent claim, or to prepare for litigation. Patent retrieval is more particular and specialized and is different from generic web searching, for example, in the following respects: 1) query text—a query in patent retrieval is often a claim, which has certain fixed structure and can be quite long, while typical web-based search queries are very short, containing few terms; 2) patent documents—a patent usually has a standard structure that includes fields such as a title, authors, application date, IPC (International Patent Code (IPC)), citations, an abstract, technical summary, and claims, while web documents can have various format and content; and 3) search purpose—the main purpose of patent retrieval is to find existing patents that relate to a searched patent, e.g., may invalidate the claims of a specified patent or patent application, while web search targets to find relevant documents or answer user questions. Given these differences, information retrieval algorithms associated with typical web-based search engines and systems are not well suited to work for patent retrieval.

Existing approaches modify baseline information retrieval algorithms in different ways. Some modify the term weighting strategy, e.g., using TF (Term Frequency) instead of TF-IDF (Term Frequency-Inverse Document Frequency) (H. Mase and M. Iwayama. 2007. Ntcir-6 patent retrieval experiments at hitachi. *Proceedings of NTCIR-6 Workshop Meetings*, pages 403-406); some investigate the effect of smoothing in a statistical language model (J. Kim, Y. H. Lee, S. H. Na, and J. H. Lee. 2007. Postech at ntcir-6 english patent retrieval subtask. *Proceedings of NTCIR-6 Workshop Meetings*, pages 393-395); some use query expansion strategies (Y. H. Tseng, C. Y. Tsai, and D. W. Huang. 2007. Invalidity search for uspto patent documents using different patent surrogates. *Proceedings of NTCIR-6 Workshop Meetings*, pages 390-392; H. Tanioka and K. Yamamoto. 2007. A passage retrieval system using query expansion and emphasis. *Proceedings of NTCIR-6 Workshop Meetings*, pages 428-432; H. Nanba. 2007. Query expansion using an automatically constructed thesaurus. *Proceedings of NTCIR-6 Workshop Meetings*, pages 414-419; Mase and Iwayama, 2007); and some leverage certain fields such as citations and IPCs of a patent (Atsushi Fujii. 2007. Enhancing patent retrieval by citation analysis. *Proceedings of the 30th Annual International ACM Conference on Research and Development in Information Retrieval (SIGIR)*, pages 793-794; M. Aono. 2007. Leveraging category-based lsi for patent retrieval. *Proceedings of NTCIR-6 Workshop Meetings*, pages 373-376). Additional methods that may be employed may use latent semantic indexing (LSI) or other latent semantic analysis. These methods are either computationally expensive or show limited improvement over the baseline. The present invention provides a method for determining, retrieving and presenting a set of patents that are most related to a patent claim-based query. The invention can be used both for the survey of prior art as well as for the determination of validity of an existing or a prospective claim. In one embodiment the invention uses a baseline text-based retrieval system to obtain the initial pool of candidate patents which are then re-ranked based on several features derived from, for example, one or more of claim text, title, abstract, preamble, IPCs of the candidate patents, and their internal citation structure. Another feature of the invention is the automatic generation of training data to train the re-ranking classifier.

In the past, different retrieval methods have been proposed for patent retrieval. Kim et al (Kim et al., 2007) perform patent retrieval using a baseline language model with Jelinek-Mercer smoothing. It is inconclusive whether the smoothing helps retrieval performance or not based on their results. Fujii (Fujii, 2007) combines two searches, one is based on text retrieval with Okapi BM25 (S. Robertson, S. Walker, S. Jones, M. M. Hancock-Beaulieu, and M. Gatford. 1994. Okapi at trec-3. In *Proceedings of the 3rd Text Retrieval Conference*, pages 109-126) and another based on citations, where citation scores are computed based on the citations of the top N documents from the text retrieval. The product of the two scores is used for final ranking.

A two-stage patent retrieval method is proposed by Mase et al (H. Mase, T. Matsubayashi, Y. Ogawa, M. Iwayama, and T. Oshio. 2005. Proposal of two-stage patent retrieval method considering the claim structure. *ACM Transactions on Asian Language Information Processing (TALIP)*, 4(2):190-206). In stage one, the standard information retrieval method is used, where the entire text of a patent is used as a retrieval target. In stage two, only the claim text is used to re-rank the top N patents from the first stage, where the relevance score is based on a selective set of claim terms with different weighting strategies. The final relevance score is a linear combination of the scores from the two stages. In another paper (Mase and Iwayama, 2007), Mase et al. compare several retrieval methods, where the methods use different term weighting strategies, query expansion strategies, and document filtering strategies. These methods show improvement over the baseline method, but are computationally expensive due to the use of whole patent text and term selections.

Query-expansion is another attempt to improve patent retrieval. Tseng et al (Tseng et al., 2007) extend the claim query with some key terms selected from the top six documents in the initial retrieval. Nanba (Nanba, 2007) uses hyponyms, abbreviations, synonyms, and related terms to expand queries. Aono (Aono, 2007) proposes a category-based Latent Semantic Indexing (LSI) method for patent retrieval. Specifically, their algorithm first categorizes the entire patent collection into categories based on IPC (International Patent Classification), followed by applying LSI to each category repeatedly. And given a query claim, the top fifty patents in its most similar category are returned as the invalidating candidates.

Compared to existing methods, the present invention offers, among other advantages, the following advantages: 1) automatically learns a ranking model through machine learning, known systems heuristically combine different ranking results from the multiple sources; 2) automatically generates training data, greatly reducing if not eliminating the expensive and time intensive step of human relevance judgment; and 3) effective and efficiently computable feature set. In one implementation the present invention provides an algorithm that improves the baseline search significantly at speeds on the millisecond level.

In one alternative embodiment, the invention provides a computer-based system for processing a user query related to patent claim terms to generate a set of patent documents responsive to the query, the system comprising: a search engine executed by a computer and being adapted to receive a query and, based on the query, to search claims of patent documents contained in at least one database and adapted to yield a first set of candidate patent documents; and a re-ranking module comprising code executable by the computer and adapted to re-rank the first set of candidate patent documents based at least in part on a set of features associated with the patents and generate a second set of ranked patent documents, the re-ranking module being adapted to weight the set of features based on a previously executed learning process. In one alternative, the re-ranking may be based at least in part on a set of features including at least one classification feature related to the subject matter of the claimed invention. In addition, re-ranking module may be further adapted to generate for each patent in the first set of candidate patent documents a set of feature scores associated with the set of features, the re-ranking module being adapted to re-rank to generate the second set of ranked patent documents based at least in part on the set of feature scores. Also, the re-ranking module may be further adapted to generate for each patent in the first set of candidate patent documents a collective score derived at least in part from a set of feature scores, the re-ranking module being adapted to re-rank to generate the second set of ranked patent documents based at least in part on the collective score associated with each patent in the first set of candidate patent documents. The set of features may comprise one or more from the group consisting of: fields of a patent; patent title; patent abstract; patent IPC code; patent references; patent claims; rank-c, representing the lowest rank of any claim of a patent in the first set of candidate patents; sim(c,c), representing a highest similarity score between the query and claims in a patent in the first set of candidate patents; sim(c,cs), representing a similarity score between the query and all the claims of a patent in the first set of candidate patents; sim(c,title), representing a similarity score between the query and the title of a patent in the first set of candidate patents; sim(c,abstract), representing a similarity score between the query and the abstract of a patent in the first set of candidate patents; sim(key,key), representing a similarity score between key concepts of the query and a patent in the first set of patents; sim(key,title), representing a similarity score between the key concept of the query and the title of a patent in the first set of patents; sim(key,abstract), representing a similarity score between the key concept of the query and the abstract of a patent in the first set of patents; IPC-overlap, representing a number of overlapping IPC codes between IPC codes of a patent in the first set of patents and the IPC codes of an initial high-ranking set of patents in the first set of patents; and direct-Cite, representing the number of patents in the initial high-ranking set of patent documents that cite or are cited by a patent in the first set of patent documents. Also, the set of feature scores may be normalized and may include IPC-overlap, representing the number of the overlapping IPC codes between the IPC codes of a patent in the first set of patent documents and the IPC codes of an initial high-ranking set of patent documents in the first set of patents, the re-ranking module further adapted to compute IPC-overlap including code adapted to define the overlap score between two IPC codes, divide each IPC code to a plurality of levels based on IPC code structure, and wherein a first level overlap between two IPC codes results in a first score and a second level overlap between two IPC codes results in a second score. The IPC-overlap of a given patent document may be the average overlap scores between the IPC codes of that patent and all the IPC codes of the initial high-ranking set of patent documents and where a patent has a low IPC-overlap score it may be assigned a relatively low relevance score. The re-ranking module may be configured based on a previously executed learning process involving automatically generated training data processed to establish a relevance weighting to be assigned to respective ones of the set of features. The learning module may collect training data and assign a relevance weighting to the set of features based at least in part on the collected training data. The search engine may comprise a baseline text-based retrieval system adapted to yield the first set of candidate patent documents. The query may comprise a plurality of separately defined query terms, one or more of the separately defined query terms processed by the search engine to delimit or weight patents included in the first set of candidate patent documents. The query may comprise a plurality of separately defined query terms, one or more of the separately defined query terms processed by the re-ranking module to delimit or weight the set of features.

In a second embodiment, the invention provides a method for receiving and processing search queries and presenting search results to users, the method comprising: receiving a query comprising terms representing a patent claim search; using a search engine to retrieve from a database a first set of patent documents, each of the first set of patent documents comprising one or more claims responsive to the query; re-ranking the first set of patent documents based on a set of patent features to generate a re-ranked set of patent documents; and generating for display an ordered list of claims from the re-ranked set of patent documents responsive to the query.

In yet a third embodiment, the invention provides a method for receiving and processing search queries and presenting search results to users, the method comprising: receiving a query comprising terms representing a patent claim search; using a search engine to retrieve from a database a set of patent claims, each of the set of patent claims responsive to the query; ranking a set of patent documents having one or more claims from the set of patent claims; re-ranking the set of patent documents using a set of patent features to generate a re-ranked set of patent documents; and generating for display an ordered list of patent claims responsive to the query from the re-ranked set of patent documents.

In yet another embodiment the present invention provides a machine-readable medium having stored thereon instructions to be executed by a machine to perform operations, the instructions comprising instructions for: presenting a graphical user interface screen including an input box for receiving a query input; receiving a query related to patent claim terms; processing the query against claims associated with patent documents represented in a database comprising patent documents to generate a set of candidate patent documents responsive to the query; re-ranking the set of candidate patent documents based at least in part on a set of patent features and generating a second set of ranked patent documents; and displaying for review a graphical user interface screen associated with the set of ranked patent documents.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 9 is a screen shot illustrating a search results screen resulting from processing the present invention.

DETAILED DESCRIPTION OF THE INVENTION

Figure 1:
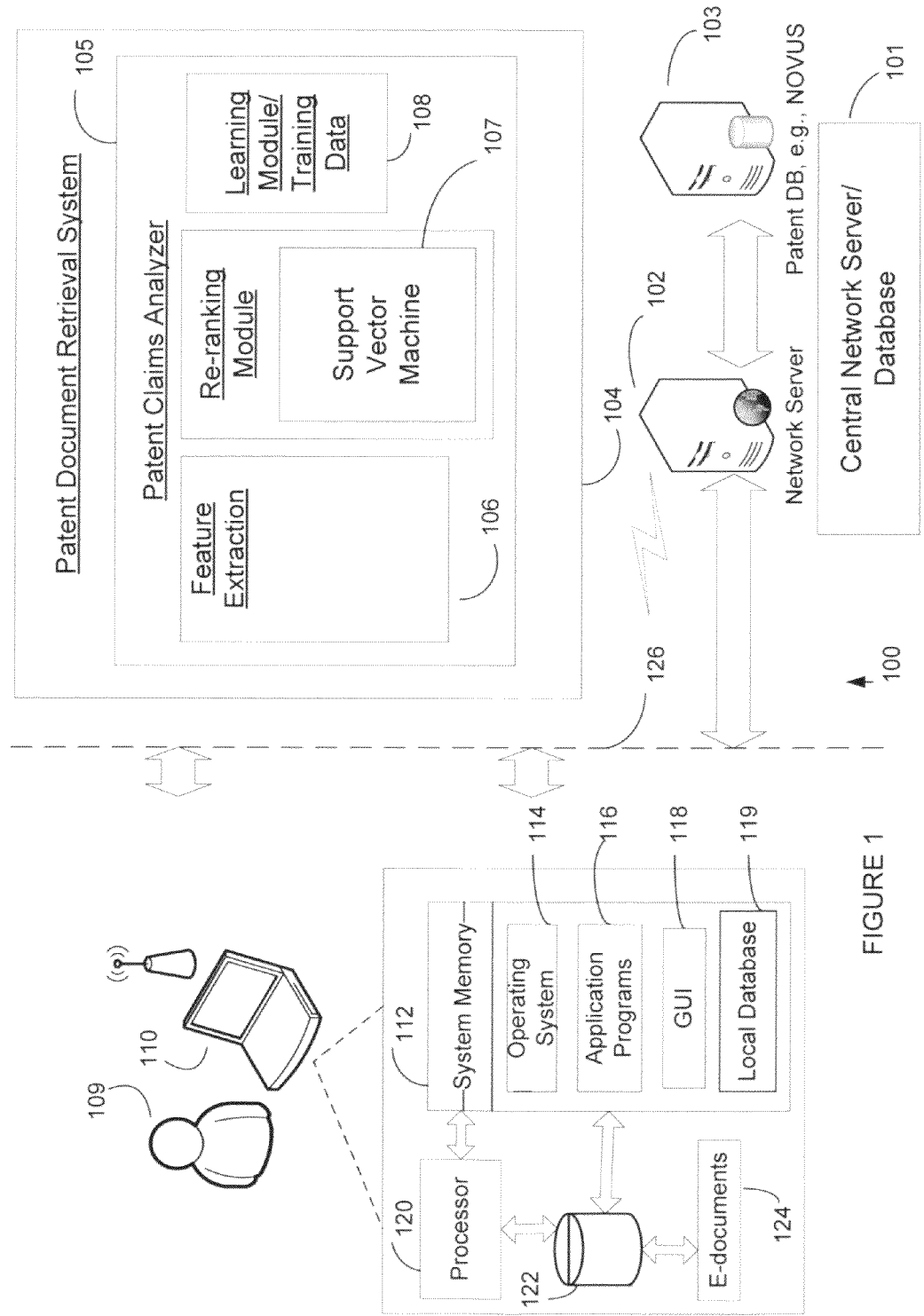
FIG. 1 is a schematic diagram illustrating an exemplary computer-based system for implementing the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides a system for patent document searching and retrieval. In one exemplary embodiment, given a claim text cq as a query, the invention returns patent documents that contain similar claims and ranks them based on relevance scoring. The system is for use in applications where cq is from an existing patent document, e.g., patent or patent application, or is not an existing issued or pending claim. In one exemplary embodiment, the invention consists of three steps: 1) retrieve a set of claims from the universe of claims based on the claim text of cq; 2) re-rank the patents whose claims are returned in Step 1; 3) return an ordered list of best matching claims from the re-ranked patents. This process is described in more detail below in the context of exemplary embodiments.

"Patent documents," as that term is used in the specification, means U.S. and non-U.S. patents and published or laid open patent applications and also documents that are derived in whole or in part from such documents. For instance, U.S. patents include the following fields, features or terms, which may be separately defined searchable fields: Abstract; Application Date; Application Serial Number; Application Type; Assignee City; Assignee Country; Assignee Name; Assignee State; Assistant Examiner; Attorney or Agent; Claims; Description/Specification; Foreign Priority; Foreign References; Government Interest; International Classification or IPC; Inventor City; Inventor Country; Inventor Name; Inventor State; Issue Date; Other References; Parent Case Information; Patent Number; Patent Type; PCT Information; Primary Examiner; Reissue Data; Title; Related US Application Data; Current US Classification; and Referenced By. Other regimes may use similar or additional fields that comprise patent documents. The invention allows users to construct queries to include claim related text as the primary or sole searching term. Users may also construct queries that include, in addition to the claim text query term, additional query terms to particularly limit or enhance importance of other terms such as those listed above. In this manner a user could, for example, search based on claim text as well as narrow the responsive set of patent documents to those related to a particular assignee, inventor, IPC or other classification, date range, issue date, etc. In this manner the set of candidate patent documents yielded by the search engine used to process the queries may be reduced or particularized to suit the user's particular search needs or goals. In an alternative manner, the system may be configured to allow a user to input and configure the system so that the re-ranking module delimits or weights certain patent related fields, such as those listed above, or delimit or weight features associated with patent related fields in the re-ranking process.

In accordance with one implementation of the invention, an Unsupervised Learning-based Retrieval (ULR) algorithm is used, for example an algorithm based on WIN search (Turtle, 1994), for the first step, i.e., the retrieval of the initial set of claims or initial set of candidate patent documents. Because claim text is usually long and has domain-specific properties, a search engine, like WIN, designed for generic information retrieval is not effective as a means for identifying and returning the most relevant claims or patent documents as the top candidates, thus necessitating re-ranking. In this example only claim text is used in the query. However, as described elsewhere, additional terms or steps may be used to arrive at an initial candidate set of claims or patent documents. Next, the re-ranking step involves the computation of several numeric features of each patent in the initial set, which will be explained in more detail below. In one embodiment a support vector machine (SVM)-based ranker, e.g., (T. Joachims. 2002b. Optimizing search engines using clickthrough data. *Proceedings of the ACM Conference on Knowledge Discovery and Data Mining (KDD)*, pages 133-142), may be used to re-rank the candidate patent documents. In addition, the ranking model may be trained based on automatically generated data, training data, the generation of which will be explained in detail below.

The following discussion provides a more detailed description of the feature extraction aspect of the exemplary embodiment of the present invention. Given a query claim cq, a search engine, e.g., a WIN search engine, is used to search all the individual claims of the patents in the search space. In this example, the patents resulting in a top set of results, e.g., in the top 100, are considered as the candidate pool. For each patent $p_i$ in the candidate pool, a set of features is computed. The following example describes ten features for computation. These features fully utilize different fields of a patent, such as title, abstract, IPC, references, and claims. These features may include some or all of the following exemplary fields: fields of a patent; patent title; patent abstract; patent IPC code; patent references; patent claims; rank-c, representing the lowest rank of any claim of a patent in the first set of candidate patents; sim(c,c), representing a highest similarity score between the query and claims in a patent in the first set of candidate patents; sim(c,cs), representing a similarity score between the query and all the claims of a patent in the first set of candidate patents; sim(c,title), representing a similarity score between the query and the title of a patent in the first set of candidate patents; sim(c,abstract), representing a similarity score between the query and the abstract of a patent in the first set of candidate patents; sim(key,key), representing a similarity score between key concepts of the query and a patent in the first set of patents; sim(key,title), representing a similarity score between the key concept of the query and the title of a patent in the first set of patents; sim(key,abstract), representing a similarity score between the key concept of the query and the abstract of a patent in the first set of patents;

IPC-overlap, representing a number of overlapping IPC codes between IPC codes of a patent in the first set of patents and the IPC codes of an initial high-ranking set of patents in the first set of patents; and direct-Cite, representing the number of patents in the initial high-ranking set of patent documents that cite or are cited by a patent in the first set of patent documents.

For example, rank-c is the 0:9ri, where ri is the lowest rank of any claim of pi in the initial WIN search. Since the initial search is against individual claims, pi may have several claims that appear in the top set of results. The embodiment may use the lowest rank among those claims to compute the feature for pi. With regard to sim(c,c), this feature is the highest similarity score between the claims of pi and cq. This feature augments the rank feature above by the similarity scores provided by the WIN search engine. This feature may be normalized by dividing by the highest score for that feature for a particular query. Next is sim(c,cs), which represents the similarity score between cq and all the claims of pi. Again this feature may be normalized by the highest score. Next is sim(c,title), which represents the similarity score between cq and the title of pi normalized as above. Next is sim(c,abstract), which represents the similarity score between cq and the abstract of pi normalized as above. Next is sim(key,key), which represents the normalized similarity score between key concepts of cq and that of pi. Often the beginning sentence of an independent claim contains words such as: comprising, consists of, include, in that, hear in and so on. These words, and words like them, are called identifiers. The words before an identifier usually point out the main subject of the claim, which may be referred to as a "key concept." The key concept of a patent is defined as the key concept of the first claim of a patent.

Another term is sim(key,title), which represents the normalized similarity score between the key concept of cq and the title of pi. Another term is sim(key,abstract), which represents the normalized similarity score between the key concept of cq and the abstract of pi. Another term is IPC-overlap. The IPC-overlap feature is based on the number of the overlapping IPCs between the IPCs of pi and those of a set of the source patents, which, for example, may be defined as the top ten patents in the candidate pool. To compute IPC-overlap, it is preferred to first define the overlap score between two IPCs. In one exemplary instance, each IPC may be divided into three levels based on structure. For example, an IPC like $A61K_i$ 009=02 has three levels A61K (level 1), A61K-009 (level 2), and $A61K_i$ 009=02 (level 3). A single-level overlap between two IPCs gives a predefined score of, for example, 0.3. The overlap scores of two IPCs are the sum of the scores from the three levels. For example, the overlap scores between $A61K_i$ 009=02 and $A61K_i$ 009=10 is 0.6 since they overlap at level 1 and level 2. The IPC overlap of pi may be defined as the average overlap scores between the IPCs of pi and all the IPCs of the all the source patents. This feature is based on the assumption that the IPCs shared by most of the source patents will reflect the topic of the query claim. Thus if a patent has a low IPC-overlap score, it is unlikely to be a relevant patent. The next feature to be discussed is direct-Cite, which is similar to IPC-overlap in that direct-Cite represents the number of source patents that cite or are cited by pi, normalized by the overall number of the source patents.

The next aspect of this preferred embodiment of the present invention is automatically generating training data. The re-ranker algorithm automatically learns the importance of the features, such as those described above, to make best use of these features. In the preferred embodiment, training data is used. Training data may be collected by human annotation of results, but this is a time consuming and expensive process. Instead, the present invention includes a way to automatically generate training data. The first step is the automatic generation of queries selected to be the first claims of a set of target patents. These queries are run through the WIN search engine to obtain the set of candidate patents and the features for these candidate patents are computed as described above. Training "labels" may be assigned to these feature vectors.

The generation of the labels relies on knowing the patent from which the query claim was selected. The assigned international patent code (IPC) and cited patents contain rich information about a particular patent. The preferred embodiment defines the following rules to judge the relevance of a candidate patent p to a target patent ptarget. First, if p's IPC matches with the IPC of the ptarget, and cites or is cited by ptarget, then p is relevant to the ptarget, and is assigned a grade A. Second, if p's IPC matches with the IPC of the ptarget, but is neither cited by nor cites ptarget, then p is considered somewhat relevant to the ptarget, and is assigned a grade C. Third, if p's IPC does not match the IPC of the ptarget, and is neither cited by nor cites ptarget, then p is judged irrelevant to the ptarget, and is assigned a grade F. In one manner, IPCs may be defined as matching if they are the same at the second level. The course of assigning automatically grades A, C and F is not error free but shows relative relevance. As long as the patents with a higher grade are more likely to be relevant to the target patent, the automatic generated training data will be satisfactory to learn the re-ranking model.

Based on the World Intellectual Property Organization, the IPC (international patent code) are distributed into eight sections. In the following experimental example all the patents in Section-A part of the IPC are used as the whole search space, which includes around a half a million patents. For each patent the title, IPC, abstract, and claims are known. It is important to note that the invention does not require the use of the full text of a patent. In the present instance, from among one-half a million patents, 10,000 patents were randomly picked to generate the training and testing data. Specifically, in this example for each patent the first claim is used to generate its candidate patents and used the rules discussed in detail below to automatically assign to them A/C/F grades. The query patents that do not result in any A's are discarded. In this exemplary test, 79 of the queries were separated and used for testing and the remaining queries were used for training. The dataset was balanced to have about the same number of A's, C's and F's but sub-sampling the C's and F's. Overall, around 5,000 patents were selected as targets, resulting in about 40,000 labeled feature vectors. SVM-light (T. Joachims. 2002a. Learning to classify text using support vector machines. Dissertation, Kluwer) with a polynomial (degree=2) kernel was used in this example to train the ranking model.

Re-ranking was performed on the 79 test query claims. For these test queries, the top 5 search results were sent to patent experts to assign grades A, C, and F, where A means very relevant, C means somewhat relevant, and F means not relevant. The human-grades were then compared to the automatically generated computer-grades below. Regarding the similarity of the computer grades to the human-grades, Table 1 shows the conditional probability of computer-grades given human-grades for around 600 candidate patents. Table 1 shows that when a patent is judged very relevant by an expert (human grade is an A), the computer grade is rarely an F; and when a patent is judged not relevant (human grade is an F), the computer grade is rarely an A. When a patent is judged somewhat relevant (C), the computer grade is most likely to be a C as well. This indicates that the computer grades are reliable in differentiating very relevant, relevant, and not relevant patents.

TABLE 1

Computer-grades vs human-grades

| P (computer grades\|human grades) | A | C | F |
|---|---|---|---|
| A | 0.40 | 0.51 | 0.09 |
| C | 0.23 | 0.66 | 0.11 |
| F | 0.08 | 0.54 | 0.38 |

Next retrieval results are examined by first comparing the results with the baseline WIN search based on the computer-grades. In Table 2 MAP(A) is the mean average precision when only A patents are considered as relevant, MAP(AC) is the MAP when A and C patents are considered as relevant, pre@kA is the precision at rank k when only A patents are considered as relevant, and pre@kAC means precision at rank k when both A and C patents are considered as relevant. As Table 2 shows, this exemplary embodiment of the invention performs substantially better than the baseline search. For example, the inventive method improves pre@10AC from 0.16 to 0.38, and improves pre@5AC from 0.72 to 0.85. The MAP shows an improvement in performance of 38%.

TABLE 2

Experiment results based on computer grades

|  | MAP(A) | pre@1AC | pre@5AC | pre@10AC |
|---|---|---|---|---|
| WIN | 0.85 | 0.80 | 0.75 | 0.72 |
| ULR | 0.90 | 0.92 | 0.88 | 0.85 |

|  | MAP(A) | pre@1A | pre@5A | pre@10A |
|---|---|---|---|---|
| WIN | 0.47 | 0.23 | 0.16 | 0.14 |
| ULR | 0.65 | 0.58 | 0.38 | 0.28 |

Table 3 shows the results based on human-grades. For this comparison two sets of results for human grading were sent, one is with direct-Cite feature and one is without direct-Cite feature. Only the top five search results were evaluated by human experts. Pre@1A and Pre@5A indicate that direct-Cite helps to push more A patents to the top. For purposes of this test human experts did not evaluate the baseline WIN search result given the fact that human grades and computer-grades match well as shown above. Based on testing, it is clear that the inventive method performs significantly better than the baseline method.

TABLE 3

Experiment results based on human grades

| Features Set | pre@1AC | pre@5AC | pre@1A | pre@5A |
|---|---|---|---|---|
| w/out direct-Cite | 0.91 | 0.84 | 0.62 | 0.42 |
| w/direct-Cite | 0.91 | 0.87 | 0.68 | 0.49 |

One significant advantage the method of the present invention has over WIN is that it not only uses features based on text similarity, but also uses features based on IPCs and citations, for example, which usually contain information complementary to information found in the text. For example, one test query performed in experimentation was directed to a search about a storage system (furniture), containing words like storage, base frame, support structure, shelf etc. Based on text similarity, WIN returned some irrelevant patents in its top five, e.g., one is about an inventory control system for walk-in display coolers and another is about tape cartridge storage system. The method of the present invention excluded such irrelevant patents from its high ranking set because, for instance, the IPCs of these irrelevant patents are different from the major IPCs of the candidate pool and they have low citation scores. Therefore, the method of this exemplary embodiment of the present invention placed such irrelevant patents farther down in ranking.

In this manner, the method of the present invention provides an unsupervised re-ranking-based patent retrieval system that is significantly better than a baseline text based retrieval system. The inventive method uses a rich set of features and may be trained on automatically generated training data, thus making the method very efficient at run time. Although certain exemplary features, e.g., IPC-overlap and direct-Cite, are discussed in describing the present invention, one of ordinary skill in the art would not so limit the invention to these expressed features and would understand the use of the invention with additional features to yield beneficial results. For instance, one could apply other encoding of these features and could employ features based on co-cite and other distance metrics between IPCs.

With reference to FIG. 1, the above processes, and as discussed in more detail below, may be carried out in conjunction with the combination of hardware and software and communications networking illustrated in the form of exemplary system 100. In this example, system 100 provides a framework for searching, retrieving, analyzing, and ranking claims and/or patent documents. System 100 may be used in conjunction with a system offering of a professional services provider, e.g., West Services Inc., a part of Thomson Reuters Corporation, and in this example includes a Central Network Server/Database Facility 101 comprising a Network Server 102, a Database of patent documents, e.g., NOVUS, 103, a Patent Document Retrieval System 104 having as components a Patent Claims Analyzer 105, a Feature Extraction module 106, a Re-ranking module 107 and a Learning Module 108. The Central Facility 101 may be accessed by remote users 109, such as via a network 126, e.g., Internet. Aspects of the system 100 may be enabled using any combination of Internet or (World Wide) WEB-based, desktop-based, or application WEB-enabled components. The remote user system 109 in this example includes a GUI interface operated via a computer 110, such as a PC computer or the like, that may comprise a typical combination of hardware and software including, as shown in respect to computer 110, system memory 112, operating system 114, application programs 116, graphical user interface (GUI) 118, processor 120, and storage 122 which may contain electronic information 124 such as electronic documents. The methods and systems of the present invention, described in detail hereafter, may be employed in providing remote users access to a searchable database. In particular, remote users may search a patent document database using search queries based on patent claims to retrieve and view patent documents of interest. Because the volume of patent documents is quite high, the invention provides scoring and ranking processes that facilitate an efficient and highly effective, and much improved, searching and retrieving operation. Client side application software may be stored on machine-readable medium and comprising instructions executed, for example, by the processor 120 of computer 110, and presentation of web-based interface screens facilitate the interaction between user system 109 and central system 101. The operating system 114 should be suitable for use with the system 101 and browser functionality described herein, for example, Microsoft Windows Vista (business, enterprise and ultimate editions), Windows 7, or Windows XP Professional with appropriate service packs. The system may require the remote user or client machines to be compatible with minimum threshold levels of processing capabilities, e.g., Intel Pentium III, speed, e.g., 500 MHz, minimal memory levels and other parameters.

The configuration thus described in this example is one of many and is not limiting as to the invention. Central system 101 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 101 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 81™, 10G™, or some other suitable database application may be used to manage the data. These tables may be organized into an RDS or Object Relational Data Schema (ORDS), as is known in the art.

Figure 2:
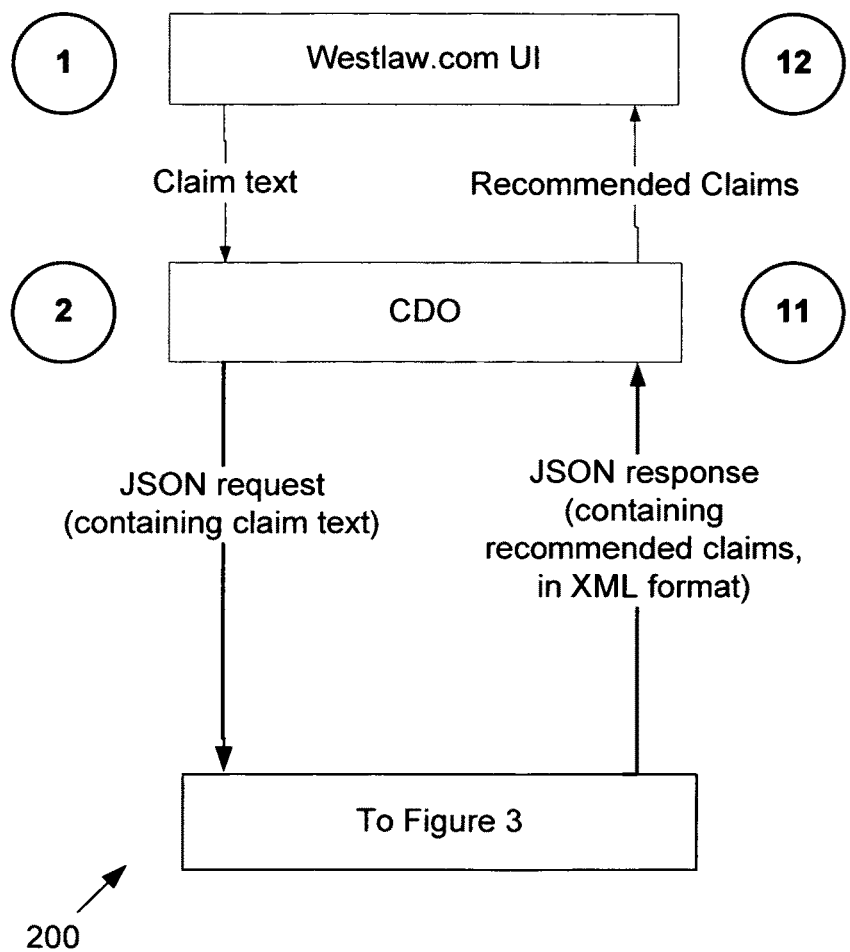
FIG. 2 is a first portion of a search flow diagram illustrating an exemplary method of implementing the present invention.
Figure 3:
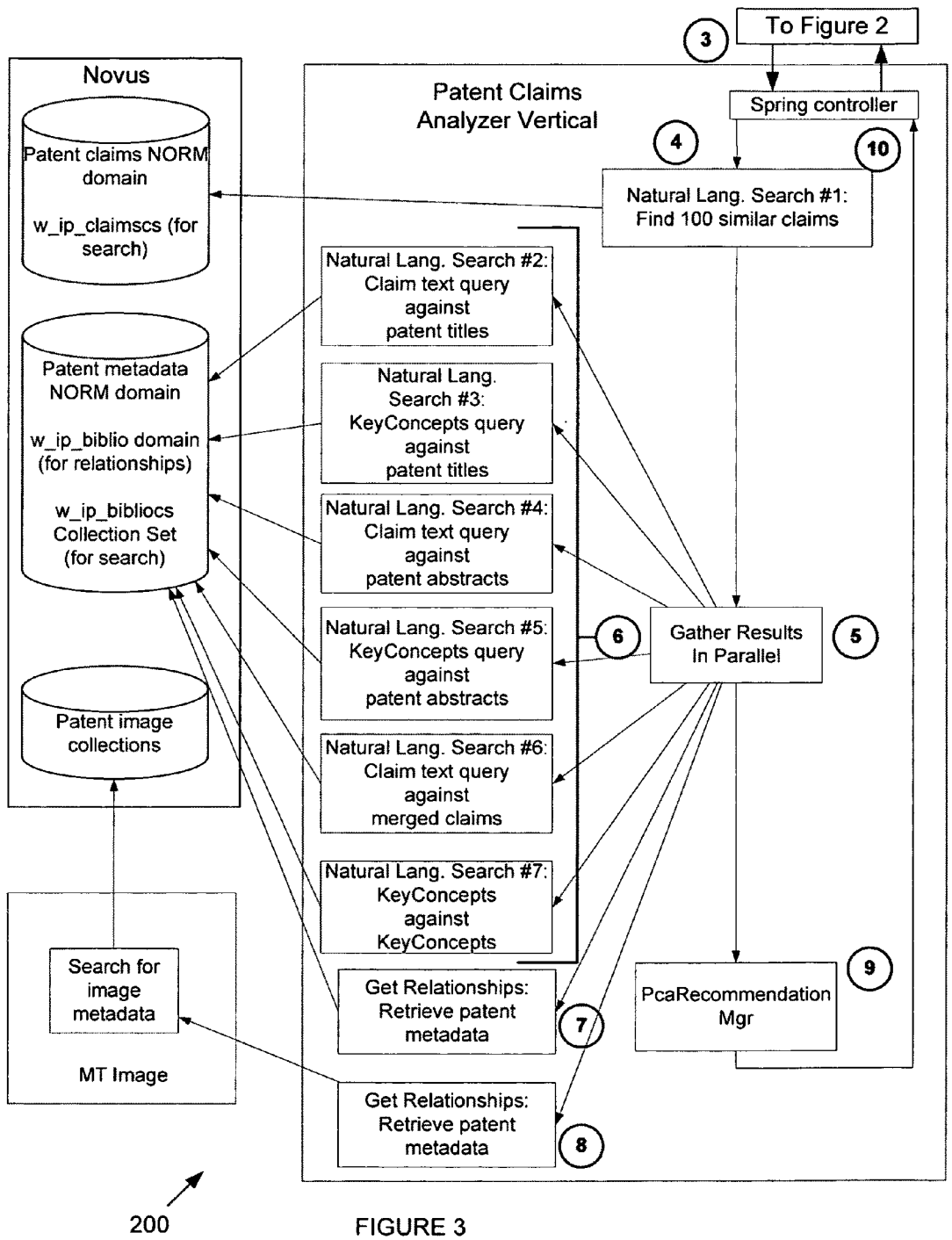
FIG. 3 is a second portion of a search flow diagram illustrating an exemplary method of implementing the present invention.

FIGS. 2 and 3 illustrate an exemplary Patent Claims Analyzer java-based vertical system 200 that accepts the text of a patent claim (which may have been entered by a user in the form of a search, or may have been derived from claim text in an existing patent, e.g., on Westlaw), and identifies, and retrieves a set of responsive patent documents, e.g., a set comprising 100 of the most similar claims. At Step 1, shown with circle #1, a user, such as a Westlaw subscriber, enters or selects claim text to analyze. Based on the query input, the UI (User Interface) layer sends the claim text to the CDO (Collaboration Data Objects) layer. At Step 2, the CDO layer creates a JSON (JavaScript Object Notation) request containing the claim text, and submits it to the vertical via an HTTP POST request. At Step 3, a Spring controller receives the request, and kicks off processing. At Step 4, an initial natural language search is performed, using the claim text as a query, against the w_ip_claimscs collection set to find up to 100 of the most relevant claims. Note that the w_ip_claimscs searches the w_ip_ptclaims relationship collection to return relationship results. In one manner, one version of a single claim may be stored within each relationship within the collection that this collection set references. In one implementation, searches may be performed directly using an application programming interface (API) associated with the database, e.g., Novus API.

At Step 5, a series of steps (6-8) occur in parallel. A fixed thread-pool created per instance of the application manages thread creation, re-use and queuing (specifically, this pool is an instance of ExecutorService, which is part of the task scheduling framework that is included with the Java Concurrency Utilities). At Step 6, six natural language searches are performed against the w_ip_bibliocs collection set (which is composed of relationship collections). In one manner, this may be based on the same relationship collection(s) on which the w_ip_biblio (biblio collection or alternatively a document collection or other collection format) domain is based. Thus, in effect, searching this collection set searches the domain. The goal of these searches isn't to find particular relationships; rather, it is to collect natural language search scores and ranking information. The searches are permutations searches against various fields with queries that consist either of the claim text passed into the vertical or the "key concepts" text, generated from the claim text by code provided by an alternative service or source. At Step 7, a getRelationships request is issued to w_ip_biblio. The relationships returned yield metadata used by for both display rendering and for input into the PcaRecommendationMgr. At Step 8, an HTTP GET request is made of the servlet that exposes the MT Image service. This call is made to return information needed to link to patent PDF documents. For instance, the Image Service servlet may be used to obtain image metadata in order to provide PDF links in the result returned by the vertical. One request may be made to obtain metadata for multiple images.

At Step 9, the search metadata (and some of the metadata returned by the getRelationships call) is provided to the PcaRecommendationMgr, which yields an optimal sort order for the 100 claims returned. At Step 10, the recommended claims are compiled into an XML result, which is inserted as a string into a JSON response created by the Spring controller. At Step 11, CDO receives and caches the recommended claim result. At Step 12, the UI transforms the XML document into an HTML result and further filtering is performed by UI manipulation of the result returned.

Figure 4:
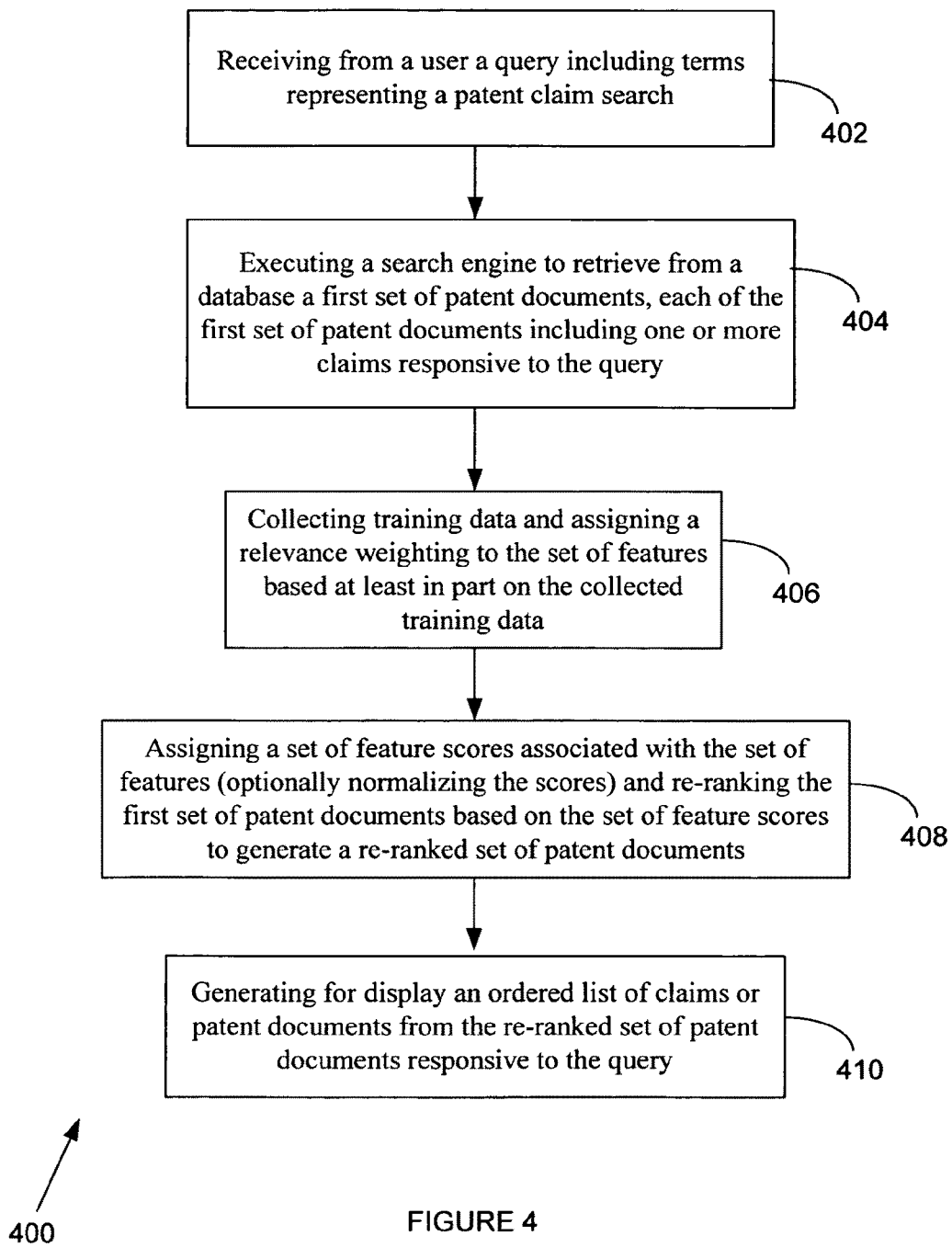
FIG. 4 is a flow chart illustrating an implementation of the present invention.

FIG. 4 is a diagram of an exemplary method 400 for processing the patent document retrieval system of the present invention. Method 400 includes process blocks 402-410 for receiving and processing search queries and presenting search results to users. Note that the processes, functions, and data sets shown and/or described herein are generally stored in a machine readable medium, such as an electronic, optical, magnetic, or ferromagnetic medium, as coded program instructions and/or data. These are used in combination with one or more processors within a single computing or data processing system or within multiple systems that are interlinked, for example via a local or wide-area network. At step 402 a user inputs a query comprising terms representing a patent claim search. At step 404 the system executes a search engine to retrieve from a database a first set of patent documents, each of the first set of patent documents comprising one or more claims responsive to the user query. At step 406, optional, the system collects training data and assigns a weighting to the set of features, which may used in scoring the various features. At step 408, the system re-ranks the first set of patent documents based on the set of patent features to generate a re-ranked set of patent documents. This may be done by generating a set of feature scores from which a similarity determination may be made. The system may also normalize the set of scores using known techniques. The method may include delimiting the set of documents using a threshold scoring requirement. At step 410, the system generates for display an ordered list of claims or patent documents from the re-ranked set of patent documents responsive to the query.

Figure 5:
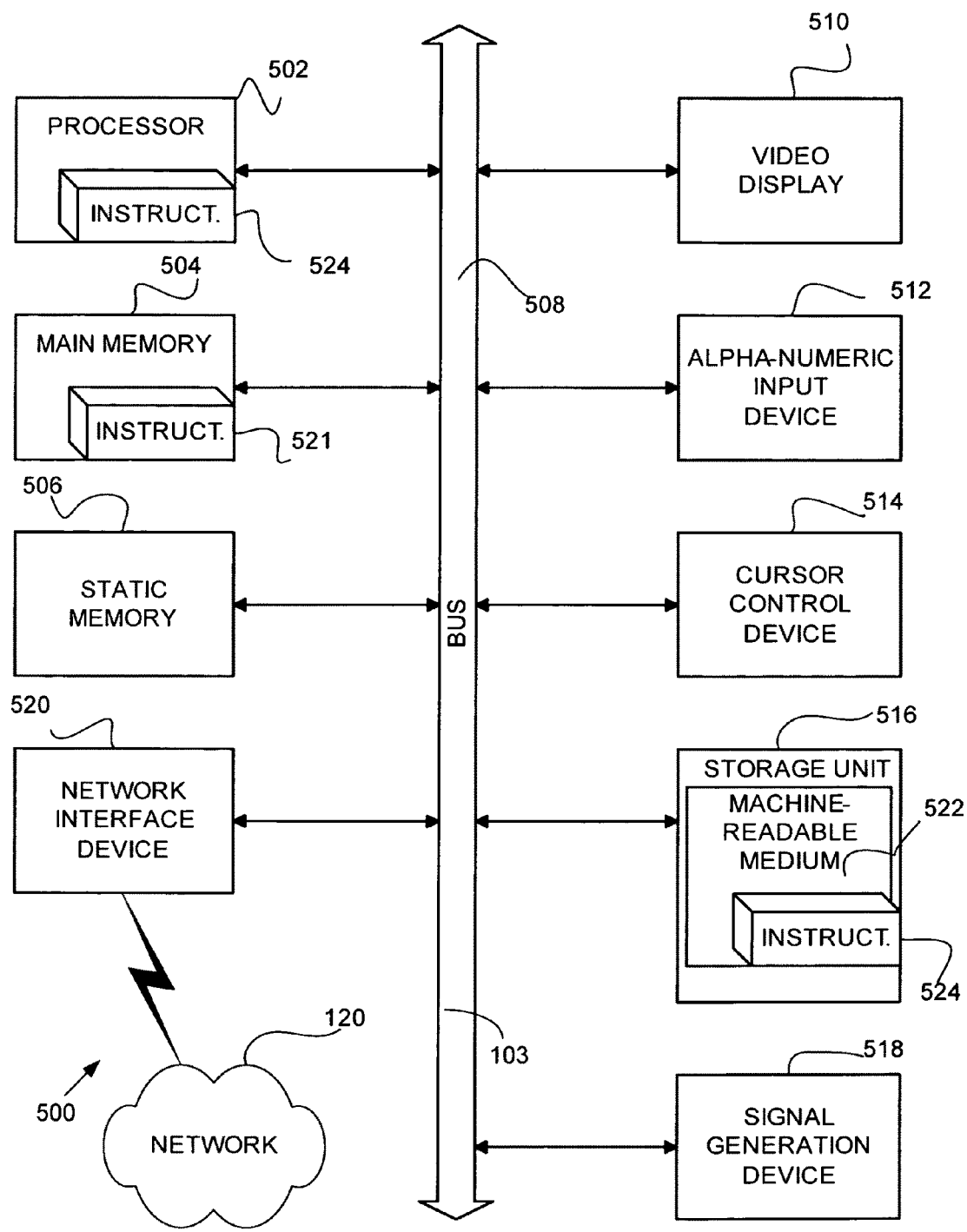
FIG. 5 is a schematic diagram of a hardware configuration of a processor-based system for implementing the present invention.

Now with reference to FIG. 5, an exemplary representation of a machine in the example form of a computer system 500 within which a set of instructions may be executed to cause the machine to perform any one or more of the methodologies discussed herein. In particular, the system 500, and variations of this, may be used to implement the Patent Document Retrieval System 104 of FIG. 1 and/or components of that system, e.g., Patent Claims Analyzer 105, Feature Extraction 106, Re-ranking module 107 and Learning Module 108. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may comprise a server computer, a client computer, a personal computer (PC), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504 and a static memory 506, which communicate with each other via a bus 508. The computer system 500 may further include a video display unit 510, a keyboard or other input device 512, a cursor control device 514 (e.g., a mouse), a storage unit 516 (e.g., hard-disk drive), a signal generation device 518, and a network interface device 520.

The storage unit 516 includes a machine-readable medium 522 on which is stored one or more sets of instructions (e.g., software 524) embodying any one or more of the methodologies or functions illustrated herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

Figure 6:
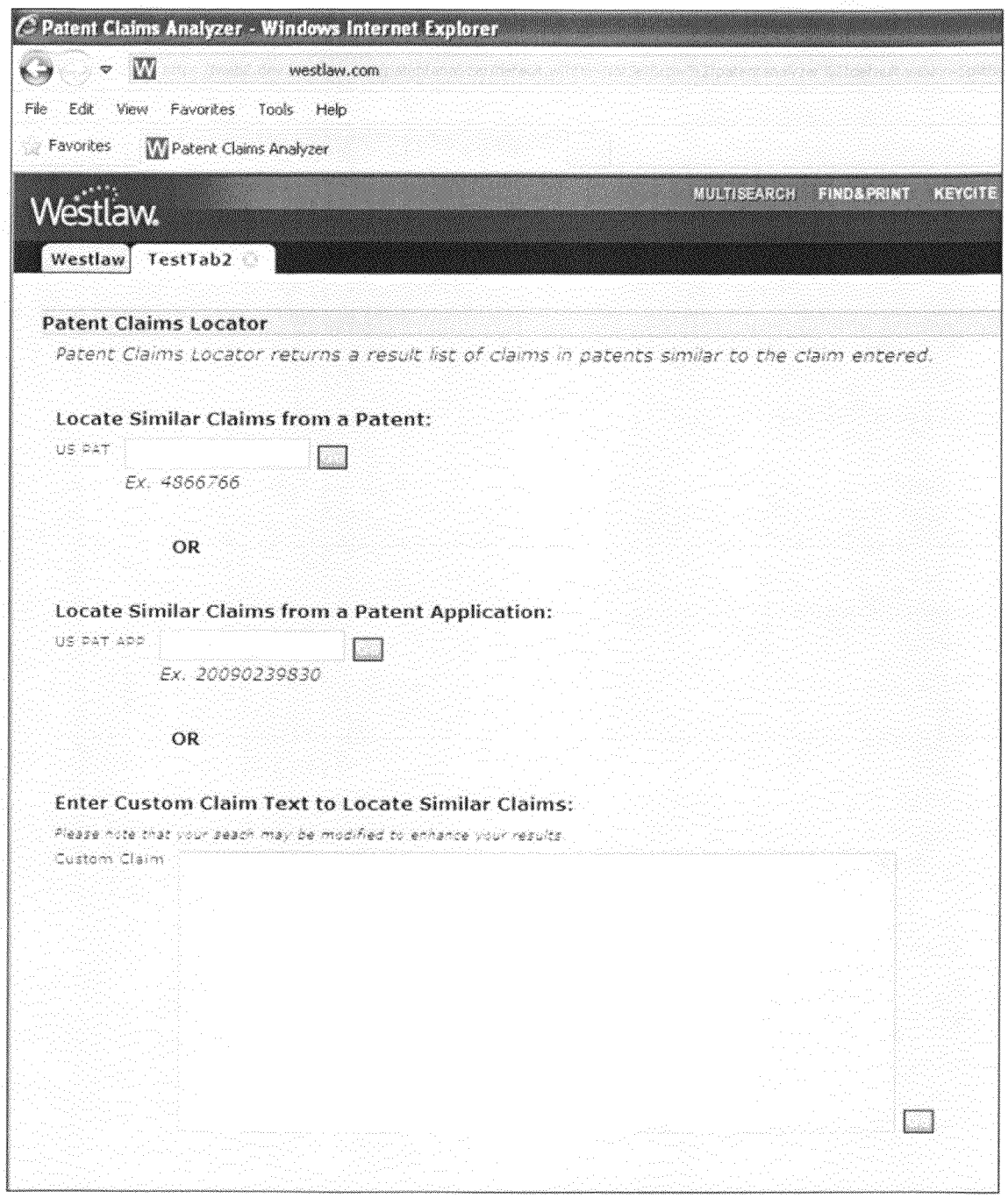
FIG. 6 is a screen shot illustrating an exemplary user interface screen having a set of fields for inputting query data used in processing the present invention.

FIG. 6 illustrates an exemplary user interface screen shot in which a user is presented with a "Patent Claims Locator" utility having a set of fields for inputting query data. In this exemplary GUI, the user may enter 1) a patent number, 2) a published patent application number, or 3) custom text representing claim language to use in the search. Upon entering the data associated with the user search, the patent claims locator function processes the query against a database of patent documents, as described hereinabove, and returns a set or list of claims or patents responsive to the query.

Figure 7:
FIG. 7 is a first portion of a screen illustrating an exemplary user interface screen for inputting search data and launching a search in conjunction with the present invention.
Figure 8:
FIG. 8 is a second portion of a screen illustrating an exemplary user interface screen for inputting search data and launching a search in conjunction with the present invention.

FIGS. 7 and 8 illustrates an exemplary user interface screen in which a user is presented with a panel of search and other functions (FIG. 7) and a set of claims from an issued U.S. Pat. No. 7,448,964 (FIG. 8). From the panel of FIG. 7, a user may navigate through the utility to perform functions such as view a history of the patent, order a file history of the patent, view a list of litigation concerning the patent, view assignments associated with the patent, view a family tree concerning the patent, view a representation of the original set of claims filed in the application resulting in the patent, view the final issued set of claims, view prior art cited in the patent, view the patent, etc.

FIG. 8 illustrates an exemplary user interface screen in which a user is presented with a set of claims from an issued U.S. Pat. No. 7,448,964, from which the user may select and submit. Upon selecting and submitting the claim to be analyzed the patent retrieval system applies the query against the database(s) using the inventive techniques described above and generates a list of claims or patents responsive to the query. In this example, the user has selected claim 1 from the '964 patent and engaged the "Analyze" button. FIG. 9 represents exemplary search results screen shot in which the searched claim, claim 1 of the '964 patent, is presented along with a set or list of matching claims identified by the system as being similar to the claim submitted. Links to the patents associated with the resulting set of claims are provided along with a set of identifying information, e.g., patent number, inventor name, issue date, and assignee name.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-based system for processing a user query related to patent claim terms to generate a set of patent documents responsive to the query, the computer-based system comprising:

a search engine executed by a computer and being adapted to receive a query and, based on the query, to search claims of patent documents contained in at least one database and adapted to yield a first set of candidate patent documents, wherein the query comprises a plurality of query permutations derived from the original query language and comprising either or both of a claim text-based query permutation and a key concept-based query permutation, and wherein the search engine is adapted to execute a plurality of query search permutations in arriving at the first set of candidate patent documents; and a re-ranking module comprising code executable by the computer and adapted to re-rank the entire first set of candidate patent documents based at least in part on a set of patent features without reducing the number of candidate patent documents in the set and generate a second set of ranked patent documents, the re-ranking module being adapted to weight the set of patent features based on a previously executed learning process;

wherein the set of patent features comprises one or more from a group consisting of: fields of a patent; patent title; patent abstract; patent IPC code; patent references; patent claims; rank-c, representing a lowest rank of any claim of a patent in the first set of candidate patent documents; sim(c,c), representing a highest similarity score between the query and claims in a patent in the first set of candidate patent documents; sim(c,cs), representing a similarity score between the query and all the claims of a patent in the first set of candidate patent documents; sim(c,title), representing a similarity score between the query and the title of a patent in the first set of candidate patent documents; sim(c,abstract), representing a similarity score between the query and the abstract of a patent in the first set of candidate patent documents; sim(key,key), representing a similarity score between key concepts of the query and a patent in the first set of candidate patent documents; sim(key, title), representing a similarity score between the key concept of the query and the title of a patent in the first set of candidate patent documents; sim(key,abstract), representing a similarity score between the key concept of the query and the abstract of a patent in the first set of candidate patent documents; IPC-overlap, representing a number of overlapping IPC codes between IPC codes of a patent in the first set of candidate patent documents and the IPC codes of an initial high-ranking set of patents in the first set of candidate patent documents; and direct-Cite, representing the number of patents in the initial high-ranking set of patent documents that cite or are cited by a patent in the first set of candidate patent documents.

2. The computer-based system of claim 1, wherein the re-ranking module is further adapted to generate for each of the first set of candidate patent documents a set of feature scores associated with the set of patent features, the re-ranking module being adapted to re-rank to generate the second set of ranked patent documents based at least in part on the set of feature scores.

3. The computer-based system of claim 2, wherein the re-ranking module is further adapted to generate for each of the first set of candidate patent documents a collective score derived at least in part from a set of feature scores, the re-ranking module being adapted to re-rank to generate the second set of ranked patent documents based at least in part on the collective score associated with each patent in the first set of candidate patent documents.

4. The computer-based system of claim 2, wherein one or more of the set of feature scores is normalized.

5. The computer-based system of claim 1, wherein the set of patent features includes IPC-overlap, representing the number of the overlapping IPC codes between the IPC codes of a patent in the first set of candidate patent documents and the IPC codes of an initial high-ranking set of patent documents in the first set of candidate patent documents, the re-ranking module further adapted to compute IPC-overlap including code adapted to define an overlap score between two IPC codes, divide each IPC code to a plurality of levels based on IPC code structure, and wherein a first level overlap between two IPC codes results in a first score and a second level overlap between two IPC codes results in a second score.

6. The computer-based system of claim 5, wherein the IPC-overlap of a given patent document is an average of the IPC-overlap scores between the IPC codes of that patent document and all the IPC codes of the initial high-ranking set of patent documents.

7. The computer-based system of claim 6, wherein an IPC-overlap score for a patent document is directly related to a relevance score of said patent document.

8. The computer-based system of claim 1, wherein the re-ranking module configured based on a previously executed learning process involves automatically generated training data processed to establish a relevance weighting to be assigned to respective ones of the set of patent features.

9. The computer-based system of claim 8, wherein the learning module collects training data and assigning a relevance weighting to the set of patent features based at least in part on the collected training data.

10. The computer-based system of claim 1, wherein the search engine comprises a baseline text-based retrieval system adapted to yield the first set of candidate patent documents.

11. The computer-based system of claim 1, wherein the query may comprise a plurality of separately defined query terms, one or more of the separately defined query terms processed by the search engine to delimit or weight patents included in the first set of candidate patent documents.

12. The computer-based system of claim 1, wherein the query comprises a plurality of separately defined query terms, one or more of the separately defined query terms processed by the re-ranking module to delimit or weight the set of patent features.

13. A method for receiving and processing search queries and presenting search results to users, the method comprising:
 a) receiving a query comprising terms representing a patent claim search;
 b) using a search engine to retrieve from a database a first set of patent information, each item of the first set of patent information comprising one or more claims responsive to the query, wherein the query comprises a plurality of query permutations derived from the original query language and comprising either or both of a claim text-based query permutation and a key concept-based query permutation, and wherein the search engine is adapted to execute a plurality of query search permutations in arriving at the first set of patent information;
 c) re-ranking the entire first set of patent information based on a set of patent features to generate a re-ranked set of patent information without reducing the number of candidate patent documents in the set, the re-ranking module being adapted to weight the set of patent features based on a set of features including at least one classification feature related to a subject matter of the claim, and wherein the set of patent features comprises one or more from a group consisting of: fields of a patent; patent title; patent abstract; patent IPC code; patent references; patent claims; rank-c, representing a lowest rank of any claim of a patent in the first set of candidate patent documents; sim(c,c), representing a highest similarity score between the query and claims in a patent in the first set of candidate patent documents; sim(c,cs), representing a similarity score between the query and all the claims of a patent in the first set of candidate patent documents; sim(c,title), representing a similarity score between the query and the title of a patent in the first set of candidate patent documents; sim(c,abstract), representing a similarity score between the query and the abstract of a patent in the first set of candidate patent documents; sim(key,key), representing a similarity score between key concepts of the query and a patent in the first set of candidate patent documents; sim(key, title), representing a similarity score between the key concept of the query and the title of a patent in the first set of candidate patent documents; sim(key,abstract), representing a similarity score between the key concept of the query and the abstract of a patent in the first set of candidate patent documents; IPC-overlap, representing a number of overlapping IPC codes between IPC codes of a patent in the first set of candidate patent documents and the IPC codes of an initial high-ranking set of patents in the first set of candidate patent documents; and direct-Cite, representing the number of patents in the initial high-ranking set of patent documents that cite or are cited by a patent in the first set of candidate patent documents; and d) generating for display an ordered set of information derived from the re-ranked set of patent information responsive to the query.

14. The method of claim 13 wherein the first set of patent information comprises patent documents.

15. The method of claim 13 wherein the ordered set of information generated for display comprises patent claims responsive to the query.

16. The method of claim 13 wherein the ordered set of information generated for display comprises a link to a patent document.

17. The method of claim 13 further comprising: collecting training data and assigning a relevance weighting to the set of patent features based at least in part on the collected training data.

18. The method of claim 13 further comprising generating for each item of the first set of patent information a set of feature scores associated with the set of patent features, and re-ranking to generate the re-ranked set patent information based at least in part on the set of feature scores.

19. The method of claim 18 further comprising normalizing one or more of the set of feature scores.

20. The method of claim 13, wherein the set of patent features includes IPC-overlap, representing the number of the overlapping IPC codes between the IPC codes of a patent in the first set of candidate patent documents and the IPC codes of an initial high-ranking set of patent documents in the first set of candidate patent documents, the re-ranking module further adapted to compute IPC-overlap including code adapted to define the overlap score between two IPC codes, divide each IPC code to a plurality of levels based on IPC code structure, and wherein a first level overlap between two IPC codes results in a first score and a second level overlap between two IPC codes results in a second score.

21. The method of claim 20, wherein the IPC-overlap of a given patent document is an average overlap scores between the IPC codes of that patent document and all the IPC codes of the initial high-ranking set of patent documents.

22. The method of claim 21, wherein said IPC-overlap score for a patent document is directly related to a relevance score of the patent document.

23. The method of claim 13, wherein the query comprises a plurality of separately defined query terms.

24. A non-transitory machine-readable medium having stored thereon instructions to be executed by a machine to perform operations, the instructions comprising instructions for:

presenting a graphical user interface screen including an input box for receiving a query input;
receiving a query related to patent claim terms;
processing the query against claims associated with patent documents represented in a database comprising patent documents to generate a first set of candidate patent documents responsive to the query, wherein the query comprises a plurality of query permutations derived from the original query language and comprising either or both of a claim text-based query permutation and a key concept-based query permutation, and wherein the instructions are adapted to execute a plurality of query search permutations in arriving at the first set of candidate patent documents;
re-ranking the entire first set of candidate patent documents based at least in part on a set of patent features without reducing the number of candidate patent documents in the set and generating a second set of ranked patent documents, the re-ranking module being adapted to weight the set of patent features based on a set of features including at least one classification feature related to a subject matter of the claim, and wherein the set of patent features comprises one or more from a group consisting of: fields of a patent; patent title; patent abstract; patent IPC code; patent references; patent claims; rank-c, representing a lowest rank of any claim of a patent in the first set of candidate patent documents; sim(c,c), representing a highest similarity score between the query and claims in a patent in the first set of candidate patent documents; sim(c,cs), representing a similarity score between the query and all the claims of a patent in the first set of candidate patent documents; sim(c,title), representing a similarity score between the query and the title of a patent in the first set of candidate patent documents; sim(c,abstract), representing a similarity score between the query and the abstract of a patent in the first set of candidate patent documents; sim(key,key), representing a similarity score between key concepts of the query and a patent in the first set of candidate patent documents; sim(key,title), representing a similarity score between the key concept of the query and the title of a patent in the first set of candidate patent documents; sim(key,abstract), representing a similarity score between the key concept of the query and the abstract of a patent in the first set of candidate patent documents; IPC-overlap, representing a number of overlapping IPC codes between IPC codes of a patent in the first set of candidate patent documents and the IPC codes of an initial high-ranking set of patents in the first set of candidate patent documents; and direct-Cite, representing the number of patents in the initial high-ranking set of patent documents that cite or are cited by a patent in the first set of candidate patent documents; and
displaying for review a graphical user interface screen associated with the second set of ranked patent documents.

25. A computer-based system for processing a user query related to patent claim terms to generate a set of patent documents responsive to the user query, the computer-based system comprising:

a search engine executed by a computer and being adapted to receive a query and, based on the query, to search claims of patent documents contained in at least one database and adapted to yield a first set of candidate patent documents, wherein the query comprises a plurality of query permutations derived from the original query language and comprising either or both of a claim text-based query permutation and a key concept-based query permutation, and wherein the search engine is adapted to execute a plurality of query search permutations in arriving at the first set of candidate patent documents; and
a re-ranking module comprising code executable by the computer and adapted to re-rank the entire first set of candidate patent documents based at least in part on a set of patent features without reducing the number of candidate patent documents in the set and generate a second set of ranked patent documents, the re-ranking module being adapted to weight the set of features based on a set of features including at least one classification feature related to a subject matter of the claim, and wherein the set of patent features comprises one or more from a group consisting of: fields of a patent; patent title; patent abstract; patent IPC code; patent references; patent claims; rank-c, representing a lowest rank of any claim of a patent in the first set of candidate patent documents; sim(c,c), representing a highest similarity score between the query and claims in a patent in the first set of candidate patent documents; sim(c,cs), representing a similarity score between the query and all the claims of a patent in the first set of candidate patent documents; sim(c,title), representing a similarity score between the query and the title of a patent in the first set of candidate patent documents; sim(c,abstract), representing a similarity score between the query and the abstract of a patent in the first set of candidate patent documents; sim(key,key), representing a similarity score between key concepts of the query and a patent in the first set of candidate patent documents; sim(key,title), representing a similarity score between the key concept of the query and the title of a patent in the first set of candidate patent documents; sim(key,abstract), representing a similarity score between the key concept of the query and the abstract of a patent in the first set of candidate patent documents; IPC-overlap, representing a number of overlapping IPC codes between IPC codes of a patent in the first set of candidate patent documents and the IPC codes of an initial high-ranking set of patents in the first set of candidate patent documents; and direct-Cite, representing the number of patents in the initial high-ranking set of patent documents that cite or are cited by a patent in the first set of candidate patent documents.

26. The computer-based system of claim 25, wherein the re-ranking module is further adapted to generate for each of the first set of candidate patent documents a set of feature scores associated with the set of patent features, the re-ranking module being adapted to re-rank to generate the second set of ranked patent documents based at least in part on the set of feature scores.

27. The computer-based system of claim 26, wherein the re-ranking module is further adapted to generate for each of the first set of candidate patent documents a collective score derived at least in part from a set of feature scores, the re-ranking module being adapted to re-rank to generate the second set of ranked patent documents based at least in part on the collective score associated with each patent in the first set of candidate patent documents.

28. The computer-based system of claim 26, wherein one or more of the set of feature scores is normalized.

29. The computer-based system of claim 25, wherein the set of patent features includes IPC-overlap, representing the number of the overlapping IPC codes between the IPC codes of a patent in the first set of candidate patent documents and the IPC codes of an initial high-ranking set of patent documents the first set of candidate patent documents, the re-ranking module further adapted to compute IPC-overlap including code adapted to define the overlap score between two IPC codes, divide each IPC code to a plurality of levels based on IPC code structure, and wherein a first level overlap between two IPC codes results in a first score and a second level overlap between two IPC codes results in a second score.

30. The computer-based system of claim 29, wherein the IPC-overlap of a given patent document is an average overlap score between the IPC codes of that patent document and all the IPC codes of the initial high-ranking set of patent documents.

31. The computer-based system of claim 30, said IPC-overlap score for a patent document is directly related to a relevance score of the patent document.

32. The computer-based system of claim 25, wherein the re-ranking module configured based on a previously executed learning process involves automatically generated training data processed to establish a relevance weighting to be assigned to respective ones of the set of patent features.

33. The computer-based system of claim 32, wherein the learning module collects training data and assigning a relevance weighting to the set of patent features based at least in part on the collected training data.

34. The computer-based system of claim 25, wherein the search engine comprises a baseline text-based retrieval system adapted to yield the first set of candidate patent documents.

35. The computer-based system of claim 25, wherein the query may comprise a plurality of separately defined query terms, one or more of the separately defined query terms processed by the search engine to delimit or weight patents included in the first set of candidate patent documents.

36. The computer-based system of claim 25, wherein the query comprises a plurality of separately defined query terms, one or more of the separately defined query terms processed by the re-ranking module to delimit or weight the set of patent features.

\* \* \* \* \*